United States Patent [19]
Moriguchi et al.

[11] Patent Number: 6,069,811
[45] Date of Patent: May 30, 2000

[54] DC POWER SUPPLY APPARATUS

[75] Inventors: Haruo Moriguchi, Itami; Toru Arai, Kyoto; Tetsuro Ikeda, Osaka; Toshikazu Fujiyoshi, Kawanishi; Masayuki Ono, Toyonaka; Hideo Ishii, Minoo, all of Japan

[73] Assignee: Sansha Electric Manufacturing Company, Limited, Osaka, Japan

[21] Appl. No.: 09/212,159

[22] Filed: Dec. 15, 1998

[30] Foreign Application Priority Data

Dec. 15, 1997 [JP] Japan ................................ 9-363394

[51] Int. Cl.⁷ .................................................. H02M 1/10
[52] U.S. Cl. .............................. 363/142; 363/52; 363/55
[58] Field of Search .................................. 363/16, 17, 37, 363/50, 52, 55, 56, 58, 98, 132, 142, 143; 361/86, 91

[56] References Cited

U.S. PATENT DOCUMENTS

| | | | |
|---|---|---|---|
| 4,437,133 | 3/1984 | Rueckert | 363/50 X |
| 5,272,313 | 12/1993 | Karino et al. | 363/142 X |
| 5,601,741 | 2/1997 | Thommes | 363/142 X |

FOREIGN PATENT DOCUMENTS 3-71218 11/1991 Japan.

OTHER PUBLICATIONS

Shikata et al.; copending patent application 09/175,830 filed Oct. 20, 1998 entitled "DC Power Supply Apparatus".

*Primary Examiner*—Y. J. Han
*Attorney, Agent, or Firm*—William H. Murray

[57] ABSTRACT

A DC power supply apparatus includes a rectifier circuit which rectifies an input commercial AC voltage. The rectifier output voltage is smoothed in a smoothing capacitor. The DC voltage from the capacitor is converted to a high-frequency voltage in an inverter. The high-frequency voltage from the inverter is voltage-transformed by a transformer into a voltage-transformed, high-frequency voltage, which is then converted back into a DC voltage in a high-frequency-to-DC converter circuit. When an input commercial AC voltage is applied to the DC power supply apparatus, a pre-charging circuit pre-charges the smoothing capacitor from the input AC voltage. If a voltage having a magnitude larger than a prescribed value is applied to the DC power supply apparatus, an overvoltage protection circuit renders the rectifier circuit and the pre-charging circuit inoperative.

8 Claims, 4 Drawing Sheets

DC POWER SUPPLY APPARATUS

This application based on Japanese Patent Application No. HEI 9-363394 filed on Dec. 15, 1997, which is incorporated herein by reference.

The present invention relates to a DC power supply apparatus for providing DC power by converting an AC voltage into a DC voltage, and, more particularly, to such power supply apparatus provided with protection against excessive input voltage applied thereto.

BACKGROUND OF THE INVENTION

DC power supply apparatuses which convert an input AC voltage to a DC voltage is used for, for example, an arc welder, an arc cutter, a discharge lamp of an overhead projector, a battery charger and an electroplating apparatus. Some of such DC power supply apparatuses are designed such as to be able to operate from either one of two commercial AC power supplies, e.g. 100 V and 200 V power supplies, one of which supplies a voltage of about one-half the voltage supplied by the other.

One example of such DC power supply apparatus is disclosed in Japanese Examined Patent Publication No. HEI 3-71218. The DC power supply apparatus disclosed in this publication includes an input-side rectifier and smoother circuit, which rectifies an input commercial AC voltage into a DC voltage and smoothes the resulting DC voltage. The smoothed DC voltage is voltage-boosted in a voltage-boosting converter including a semiconductor switching device. The voltage-boosting converter also operates to align the phase of input current to the apparatus with the phase of the input voltage so as to increase a power factor. The output voltage of the voltage-boosting converter is applied to an inverter including semiconductor switching devices, where it is converted to a high-frequency voltage. The high-frequency voltage is then voltage-transformed to a desired voltage by a transformer. The resulting, voltage-transformed, high-frequency voltage is then rectified and smoothed in an output DC providing circuit and is applied to a load.

The DC power supply apparatus of this publication is designed such that it can be operated from an input commercial voltage of 200 V, for example. If a commercial AC voltage of 100 V is applied to this power supply apparatus, the voltage-boosting converter provides the inverter with a boosted voltage which is equal to the voltage which would be supplied to the inverter if a 200 V AC voltage is inputted to the power supply apparatus. Accordingly, the DC power supply apparatus disclosed in Japanese Examined Patent Publication No. HEI 3-71218 can be used in both a 100 V commercial supply voltage system and a 200 V commercial supply voltage system.

There are countries in which both 200 V and 400 V commercial AC voltages are available. If the DC power supply apparatus described above is used in such countries, it can operate normally from a 200 V AC voltage, but it will be damaged when it is operated from 400 V. In order to prevent such apparatus from being damaged even when it is erroneously supplied with 400 V voltage, semiconductor switching devices used in the voltage-boosting converter and the inverter should have a withstanding voltage higher than that of semiconductor switching devices conventional power supply apparatus employ. The use of such high withstanding voltage devices disadvantageously increases the cost of power supply apparatus.

An object of the present invention is to provide a DC power supply apparatus in which semiconductor switching devices having a relatively low withstanding voltage are used, and which does not fail even when an excessive voltage is applied to the apparatus.

SUMMARY OF THE INVENTION

A DC power supply apparatus according to the present invention includes a rectifier circuit for rectifying an input commercial AC voltage. A smoothing capacitor smoothes the rectified voltage outputted from the rectifier circuit. A DC-to-high-frequency converter circuit (hereinafter referred to as DC-to-HF converter circuit) converts the smoothed DC voltage from the smoothing capacitor into a high-frequency voltage. The high-frequency voltage from the DC-to-HF converter circuit is voltage-transformed by a transformer, and the voltage-transformed, high-frequency voltage is converted to a DC voltage by a high-frequency-to-DC converter circuit (hereinafter referred to as HF-to-DC converter circuit). When the input AC voltage is applied to the DC power supply apparatus, a pre-charging circuit pre-charges the smoothing capacitor from the input AC voltage. An overvoltage protection circuit renders the pre-charging circuit and the rectifier circuit inoperative when the input commercial voltage is higher than a prescribed voltage.

The DC-to-HF converter circuit may comprise an inverter or a switching regulator.

The overvoltage protection circuit may comprise an AC-to-DC converter circuit for converting the commercial AC voltage into a DC voltage, a comparator circuit for comparing the voltage from the AC-to-DC converter circuit with a reference voltage, and switching devices which are de-energized when the comparator output indicates that the DC voltage from the AC-to-DC converter circuit is higher than the reference voltage. The switching devices are disposed in the current path of the pre-charging circuit and in the current path of the rectifier circuit.

The overvoltage protection circuit may comprise switching devices disposed in the current path of the pre-charging circuit and in the current path of the rectifier circuit, and a control circuit for controlling the switching devices. The control circuit causes the switching devices to be closed when no current is flowing in the control circuit, and causes the switching devices to be opened when current is flowing in the control circuit. A constant voltage device is connected in series with the control circuit, and the input commercial AC voltage is applied across the series combination of the constant voltage device and the control circuit. The constant voltage device conducts current therethrough when a voltage higher than a predetermined value is applied to it.

The overvoltage protection circuit may operate to decouple the pre-charging circuit and the rectifier circuit from the input commercial AC voltage when the input commercial AC voltage is higher than a prescribed voltage. The overvoltage protection circuit may comprises a switch which can couple or decouple the input voltage to and from the pre-charging circuit and the rectifier circuit. The overvoltage protection circuit comprises further an AC-to-DC converter circuit for converting the commercial AC voltage to a DC voltage, a comparator circuit for comparing the voltage from the AC-to-DC converter circuit with a reference voltage, and a control circuit which causes the switch to decouple the input voltage when the comparator output indicates that the voltage from the AC-to-DC voltage is above the reference voltage. Alternatively, the overvoltage protection circuit may include, in addition to the switch, a series combination of a control circuit and a constant voltage device. The input commercial voltage is applied across the series combination. The constant voltage device conducts current therethrough when a voltage higher than the prescribed voltage is applied to it. The control circuit causes the switch to be closed when current is flowing in the control circuit and to be opened when no current is flowing in the control circuit.

A voltage-boosting converter may be connected between the rectifier circuit and the smoothing capacitor. The voltage-boosting converter operates to boost the output voltage of the rectifier circuit to a predetermined voltage and also to so adjust an input current as to be in phase with an input voltage to thereby improve a power factor of the apparatus. The predetermined voltage to which the rectifier output voltage is to be boosted may be a voltage lower than the prescribed voltage.

The DC-to-HF converter circuit may be a zero-voltage switching inverter which operates to switch when a voltage applied thereto becomes zero. The inverter may include a parallel combination of series combinations of switching devices. Each series combination includes two serially connected switching devices. The transformer provides a load of the inverter. The HF-to-DC converter may include a rectifier and a saturable reactor connected in series with the rectifier.

BRIEF DESCRIPTION OF THE DRAWINGS

FIGS. 3(a)–3(g) show waveforms appearing at various portions of the circuit shown in FIG. 1.

DETAILED DESCRIPTION OF THE INVENTION

Figure 1:
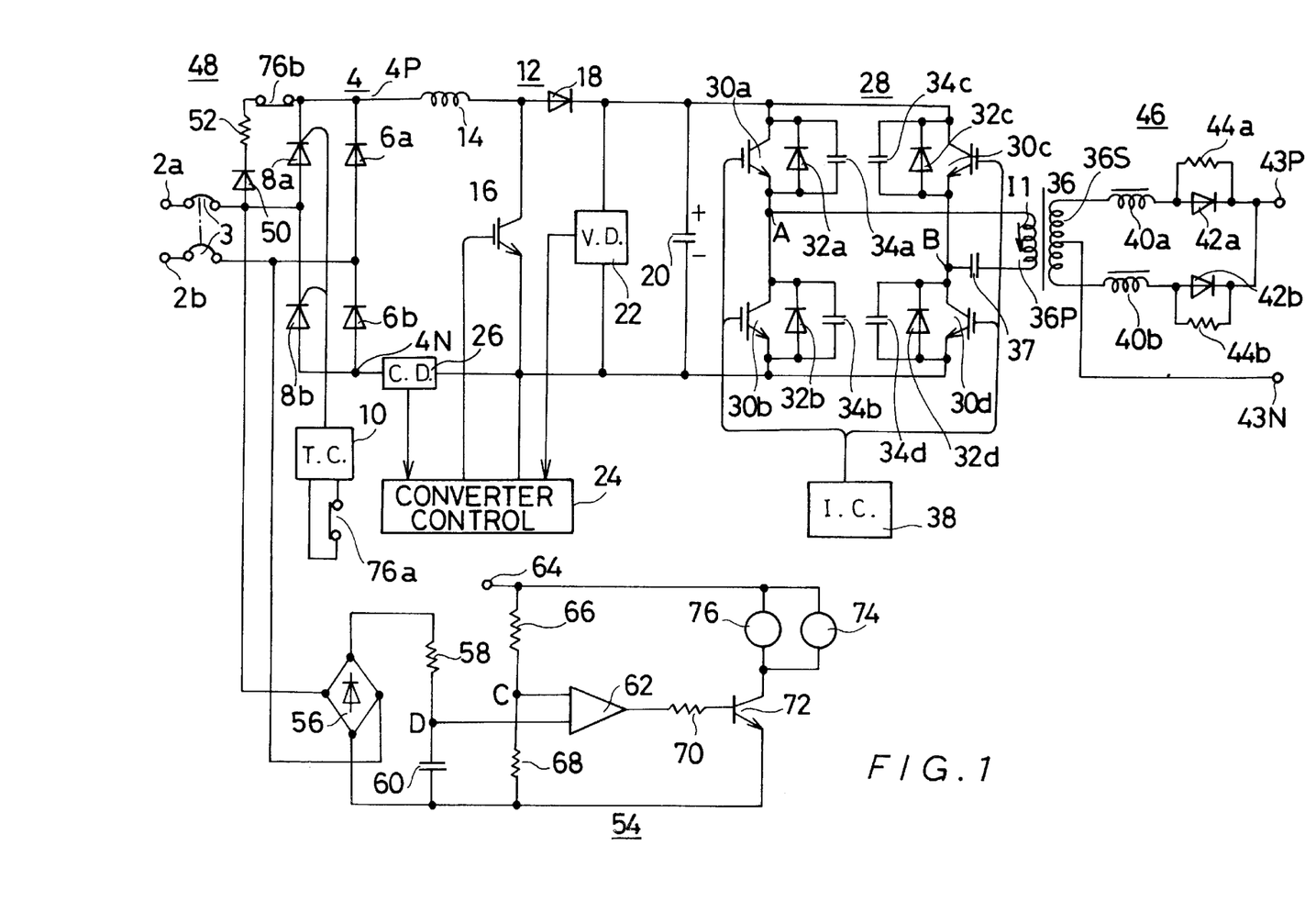
FIG. 1 is a block circuit diagram of a DC power supply apparatus according to an embodiment of the present invention.

A DC power supply apparatus according to one embodiment of the present invention, which can be used with, for example, an arc welder, an arc cutter, an overhead projector, an electric charger and an electroplating apparatus, is shown in FIG. 1. The DC power supply apparatus includes voltage supply input terminals 2a and 2b, between which a commercial AC supply providing, for example, a 100 V or 200 V AC voltage is normally connected, but, in countries where AC voltages of 200 V and 400 V are commercially available, the 400 V AC voltage may be inadvertently applied to it.

The input terminals 2a and 2b are connected via a switch 3 to an input of input rectifier circuit 4, which includes a series combination of rectifier diodes 6a and 6b and a series combination of thyristors 8a and 8b. The two series combinations are connected in parallel. The junction of the diodes 6a and 6b and the junction of the thyristors 8a and 8b provide input nodes of the input rectifier circuit 4. The junction of the cathodes of the thyristor 8a and the diode 6a provides a positive output node 4P of the input rectifier circuit 4, and the junction of the anodes of the thyristor 8b and the diode 6b provides a negative output node 4N of the input rectifier circuit 4. Each of the thyristors 8a and 8b is rendered conductive when a gate signal is applied to its gate from a thyristor control circuit (T.C.) 10, with positive and negative potentials being applied to its anode and cathode, respectively.

A voltage-boosting converter 12 is connected to the output of the input rectifier circuit 4. Specifically, the positive output node 4P of the input rectifier circuit 4 is connected to an output electrode of a semiconductor switching device, e.g. to a collector of an IGBT 16, through a smoothing reactor 14. The emitter of the IGBT 16 is connected to the negative output node 4N of the input rectifier circuit 4. The collector of the IGBT 16 is connected also to a positive electrode of a smoothing capacitor 20 through a reverse-current blocking diode 18. The negative electrode of the smoothing capacitor 20 is connected to the negative output node 4N of the input rectifier circuit 4.

The voltage across the smoothing capacitor 20 is detected by a voltage detector (V.D.) 22. The voltage detector 22 provides a voltage-representative signal which is representative of the detected voltage across the smoothing capacitor 20. The voltage-representative signal is applied to a voltage-boosting converter control circuit (C.C.) 24.

A current detector (C.D.) 26 is connected between the emitter of the IGBT 16 and the negative output node 4N of the input rectifier 4 for detecting the phase of the current flowing through the voltage-boosting converter 12, i.e. the current inputted to the DC power supply apparatus and developing a phase-representative signal representing the detected phase. The phase-representative signal is applied to a voltage-boosting converter control circuit 24.

The voltage-boosting converter control circuit 24 provides a gate signal to the IGBT 16 to render it conducive. When the gate signal is removed, the IGBT 16 becomes nonconductive. During the conduction of the IGBT 16, energy is stored in the smoothing reactor 14. When the IGBT 16 becomes nonconductive, the output voltage of the input rectifier 4 is superposed on counterelectromotive force generated in the smoothing reactor 14 due to the energy stored therein when the IGBT 16 is conductive. Thus, the output voltage of the input rectifier 4 is boosted. The gate signal provided by the voltage-boosting converter control circuit 24 has such a duration that the voltage across the smoothing capacitor 20 as represented by the voltage-representative signal developed by the voltage detector 22 is equal to the peak voltage of a voltage resulting from rectifying a predetermined voltage, e.g. a 200 V AC voltage. Although not shown, the voltage-boosting converter control circuit 24 detects also the phase of the AC voltage applied between the input terminals 2a and 2b, and the gate signal applied to the IGBT 16 is adjusted also such that the phase of the input current as represented by the phase-representative signal developed by the current detector 26 becomes in phase with the input AC voltage. The described arrangement makes it possible for the predetermined voltage to be developed all the time across the smoothing capacitor 20. In addition, since the described arrangement can make the input voltage and the input current coincident in phase with each other, it can improve the power factor of the apparatus.

The output voltage of the voltage-boosting converter 12, i.e. the voltage developed across the smoothing capacitor 20 is applied to a DC-to-high-frequency (DC-to-HF) converter circuit, e.g. an inverter 28. The inverter 28 includes a first series combination of semiconductor switching devices, e.g. IGBTs 30a and 30b, connected in parallel with the smoothing capacitor 20, with the collector of the IGBT 30a and the emitter of the IGBT 30b connected to the positive and negative electrodes of the smoothing capacitor 20, respectively. The emitter of the IGBT 30a is connected to the collector of the IGBT 30b.

The cathode and anode of a current-circulating diode 32a are connected to the collector and emitter of the IGBT 30a, respectively. In other words, the current-circulating diode 32a is back-to-back connected to the IGBT 30a. Also, a current-circulating diode 32b is back-to-back connected to the IGBT 32b. Capacitors 34a and 34b are connected in parallel with the collector-emitter conduction paths of the IGBTs 30a and 30b, respectively.

A second series combination of IGBTs 30c and 30d is connected in parallel with the first series combination, with the collector of the IGBT 30c connected to the positive electrode of the smoothing capacitor 20 and with the emitter of the IGBT 30d connected to the negative electrode of the smoothing capacitor 20. The emitter of the IGBT 30c is connected to the collector of the IGBT 30d to complete the second series combination.

Current-circulating diodes 32c and 32d are back-to-back connected to the IGBTs 30c and 30d, respectively. Also, capacitors 34c and 34d are connected in parallel with the collector-emitter conduction paths of the IGBTs 30c and 30d, respectively.

The junction of the emitter of the IGBT 30a and the collector of the IGBT 30b provides one output node A of the inverter 28, while the junction of the emitter of the IGBT 30c and the collector of the IGBT 30d provide the other output node B of the inverter 28. A primary winding 36P of a transformer 36 is connected in series with a DC blocking capacitor 37 between the output nodes A and B. As described above, the inverter 28 comprises the IGBTs 30a, 30b, 30c and 30d which are connected in a full-bridge configuration.

An inverter control circuit (I.C.) 38 provides gate signals independently to the IGBTs 30a–30d to control their conduction. Each of the IGBTs 30a–30d is rendered conductive when a gate signal is applied to the gate electrode thereof from the inverter control circuit 38. When, for example, the IGBTs 30a and 30d are conductive, current flows through the IGBT 30a, the primary winding 36P of the transformer 36 and the IGBT 30d. When a gate signal is applied to each of the IGBTs 30b and 30c, current flows through the IGBT 30c, the primary winding 36P of the transformer 36 and the IGBT 30b. This causes an AC voltage to be induced in a secondary winding 36S of the transformer 36. The gate signals to be applied to the gates of the IGBTs 30a–30d have a frequency of from 20 KHz to 500 KHz, and, therefore, the voltage induced in the secondary winding 36S is a high-frequency voltage.

An intermediate tap is disposed on the secondary winding 36S of the transformer 36 and is connected to a negative output terminal 43N of the DC power supply apparatus. One end of the secondary winding 36S is connected to the anode of a rectifier diode 42a through a saturable reactor 40a. The cathode of the diode 42a is connected to a positive output terminal 43P of the DC power supply apparatus. The other end of the transformer secondary winding 36S is connected through a saturable reactor 40b to the anode of a rectifier diode 42b of which the cathode is connected to the positive output terminal 43P. Protection resistors 44a and 44b are connected in parallel with the diodes 42a and 42b, respectively. The saturable reactors 40a and 40b and the rectifier diodes 42a and 42b form an output high-frequency-to-DC (HF-to-DC) converter circuit 46.

The DC power supply apparatus of the present invention also includes a pre-charging circuit 48. The pre-charging circuit 48 includes a diode 50 having its anode connected to one input node of the input rectifier circuit 4 for half-wave rectification of the input commercial AC voltage. The cathode of the diode 50 is connected through a current limiting resistor 52 to the junction of the smoothing reactor 14 and the cathode of the diode 6a. Upon the application of the input commercial AC voltage between the input terminals 2a and 2b, the pre-charging circuit 48 immediately starts charging the smoothing capacitor 20 through the smoothing reactor 14 so that the smoothing capacitor 20 has been charged before the voltage-boosting converter 12 starts charging it, whereby no excessive current flows through the voltage-boosting converter 12.

The DC power supply apparatus includes further an overvoltage protection circuit 54. The overvoltage protection circuit 54 includes a bridge-type rectifier 56 connected in the input circuit of the input rectifier circuit 4 for detecting the input commercial AC voltage. The output of the rectifier 56 is connected to a series combination of a resistor 58 and a smoothing capacitor 60, which smoothes the rectifier output.

A voltage developed across the smoothing capacitor 60 is applied to one input of a comparator 62, which receives at the other input a reference voltage resulting from voltage-dividing a voltage at a voltage node 64 by resistors 66 and 68, as will be described later. Whichever magnitude, namely, for example, 100 V, 200 V or 400 V the input AC voltage applied between the input terminals 2a and 2b has, the voltage at the voltage node 64 is maintained constant, as will be described later. Accordingly, the reference voltage is also fixed.

On the other hand, the value of the voltage developed across the smoothing capacitor 60 depends on the magnitude of the input commercial AC voltage. The voltage across the capacitor 60 is higher than the reference voltage when the AC voltage of 400 V is applied between the input terminals 2a and 2b.

The comparator 62 develops as its output a H-level signal when the voltage across the smoothing capacitor 60 is higher than the reference voltage. The H-level signal is applied through a resistor 70 to a semiconductor switching device, e.g. to the base of an NPN transistor 72. The emitter of the transistor 72, together with respective one ends of the smoothing capacitor 60 and resistor 68, is connected to the rectifier 56, and the collector is connected to the voltage node 64 via a parallel combination of an indicator lamp 74 and a relay coil 76.

Two normally closed contacts 76a and 76b are provided, being associated with the relay coil 76. The normally closed contact 76a is connected to the thyristor control circuit 10. During the closure of the contact 76a, the thyristor control circuit 10 provides gate signals to the thyristors 8a and 8b. The normally closed contact 76b is connected between the smoothing reactor 14 and the resistor 52 of the pre-charging circuit 48. When the contact 76b is close, the pre-charging circuit 48 pre-charges the smoothing capacitor 20.

In operation of the DC power supply apparatus with the above-described arrangement, when a commercial AC voltage of 100 V or 200 V, for example, is applied between the input terminals 2a and 2b, the output from the comparator 62 is not high. Accordingly, the transistor 72 is not conductive and, therefore, the normally closed contacts 76a and 76b are maintained closed.

Accordingly, only after the smoothing capacitor 20 is pre-charged by the pre-charging circuit 48, the rectified voltage from the input rectifier circuit 4 is boosted by the voltage-boosting converter 12 and applied to the smoothing capacitor 20. As will be described later, the voltage across the capacitor 20 is applied to the inverter 28 where it is converted to a high-frequency voltage, voltage-transformed by the transformer 36, converted into a DC voltage in the output HF-to-DC converter circuit 46, and, then, applied to a load via the output terminals 43P and 43N.

Assuming that a commercial AC voltage of 400 V is inadvertently applied between the input terminals 2a and 2b, the comparator 62 develops an H-level output signal, which is applied to the base of the transistor 72. This causes the transistor 72 to be rendered conductive, which, in turn, energizes the indicator lamp 74 to indicate that a voltage above a prescribed magnitude is being applied to the apparatus. At the same time, current flows in the relay coil 76. This causes the normally closed contacts 76a and 76b to be opened. When the normally closed contact 76a is opened, no gate signals are applied to the thyristors 8a and 8b, and, therefore, no output voltage is available in the output side of the input rectifier circuit 4. Also, because of the opening of the normally closed contact 76b, the pre-charging circuit 48 does not pre-charge the smoothing capacitor 20. Accordingly, erroneous application of the 400 V commercial AC voltage will damage none of the IGBTs or the smoothing capacitors used in the DC power supply apparatus even if they are such devices that cannot withstand a voltage which would result from rectifying the 400 V AC voltage.

Figure 2:
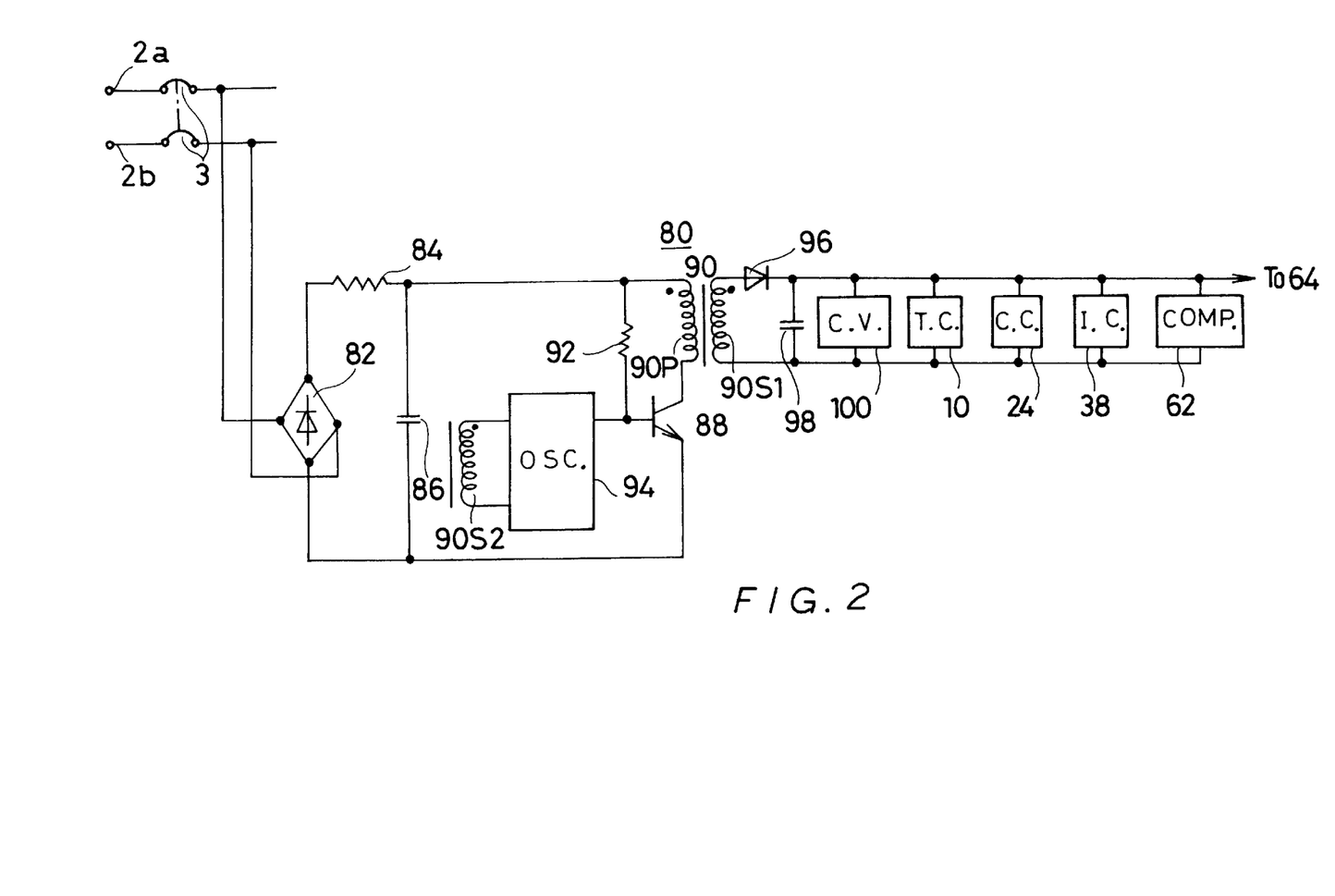
FIG. 2 is a block circuit diagram of a switching regulator which can be used in the DC power supply apparatus shown in FIG. 1.

The voltage at the voltage node 64 may be developed by, for example, a self-excited switching regulator 80 as shown in FIG. 2. The self-excited switching regulator 80 includes a rectifier 82 having an input which receives the input commercial AC voltage through the switch 3. The rectified voltage from the rectifier 82 is smoothed by a resistor 84 and a smoothing capacitor 86. A DC voltage developed across the smoothing capacitor 86 is applied across a series combination of a semiconductor switching device, e.g. the collector-emitter conduction path of a transistor 88, and a primary winding 90P of a transformer 90.

An activating resistor 92 is connected between the base of the transistor 88 and the positive electrode of the smoothing capacitor 86. The transformer 90 also includes a first secondary winding 90S1 and a second secondary winding 90S2. A self-excited oscillator 94 is connected to the second secondary winding 90S2. The output of the oscillator 94 is applied to the base of the transistor 88 so as to cause the transistor 88 to switch at a high frequency. This, in turn, causes induction of a high-frequency voltage in the first secondary winding 90S1. The high-frequency voltage is rectified by a diode 96 and smoothed by a smoothing capacitor 98. A voltage developed across the capacitor 98 is regulated to be constant in a constant voltage circuit (C.V.) 100, and the constant voltage is coupled to the voltage node 64.

Thus, whichever value the input AC voltage has, 100 V, 200 V or 400 V, a voltage of a fixed magnitude is developed at the voltage node 64. The constant voltage available from the constant voltage circuit 100 is supplied to the thyristor control circuit (T.C.) 10, the voltage-boosting converter control circuit (C.C.) 24, the inverter control circuit (I.C.) 38 and to the comparator (COMP.) 62 as their supply voltage.

Next, the operations of the inverter 28 and the output HF-to-DC converter circuit 46 are described with reference to FIG. 3.

Figure 3A:
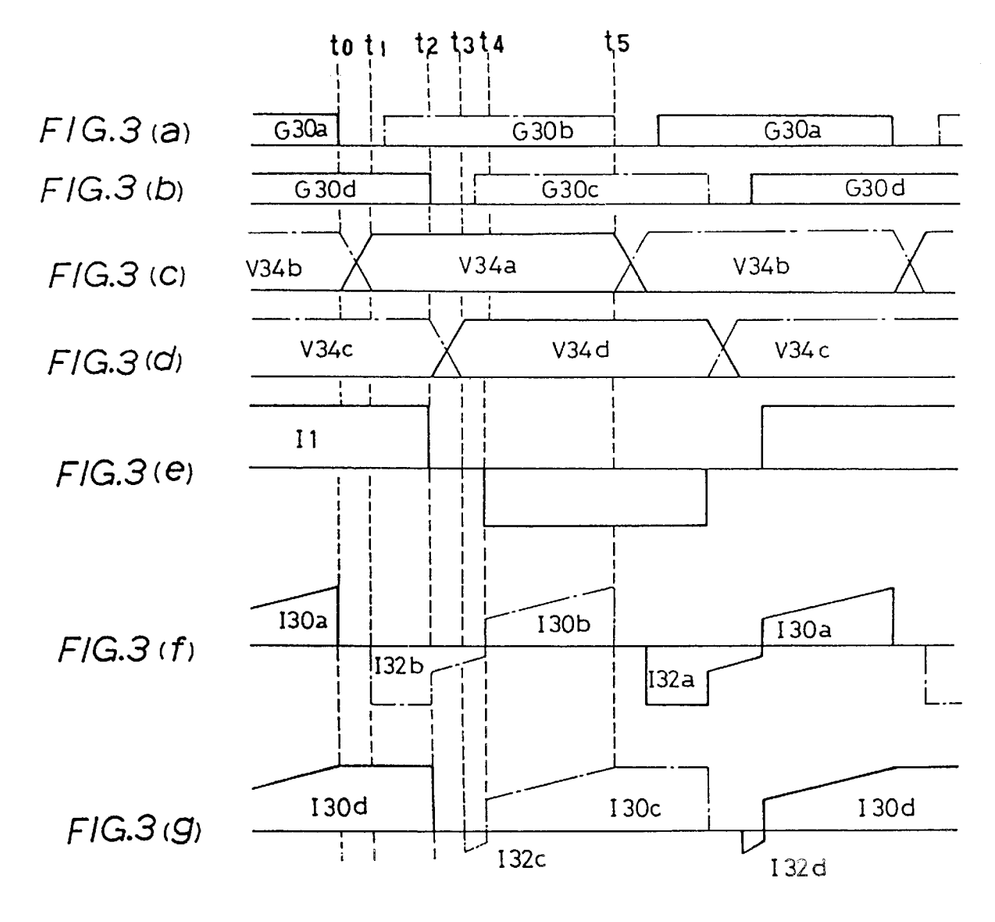

Before a time $t_0$, gate signals G30a and G30d are applied to the gates of the IGBTs 30a and 30d, respectively, as shown in FIGS. 3(a) and 3(b). This renders the IGBTs 30a and 30d conductive. At this time, no gate signals are applied to the gates of the IGBTs 30b and 30c, so that they are nonconductive. As a result, current flows through the IGBT 30a, the primary winding 36P of the transformer 36, the capacitor 37 and the IGBT 30d. As shown in FIGS. 3(c) and 3(d), the capacitors 34a and 34d are short-circuited and discharged, whereas the capacitors 34b and 34c are charged.

Before the time $t_0$, the current I1 shown in FIG. 3(e) flows through the primary winding 36P, and currents 130a and 130d shown in FIGS. 3(f) and 3(g) flow through the diodes 32a and 32d, respectively. In FIGS. 3(f) and 3(g), the direction of currents 130a, 130b, 130c and 130d flowing through the IGBTs 30a, 30b, 30c and 30d, respectively, is shown to be positive, and the direction of currents 132a, 132b, 132c and 132d flowing through the diodes 32a, 32b, 32c and 32d is shown to be negative.

Thus, sufficiently large current induced in the secondary winding 36S of the transformer 36 is supplied through the saturable reactor 40a to the load connected between the output terminals 43N and 43P. The flow of sufficiently large current saturates the saturable reactor 40a.

At the time $t_0$, the gate signal G30a is removed from the gate of the IGBT 30a, so that the current 130a flowing through the IGBT 30a becomes zero, as shown in FIG. 3(f). However, current flows from the input of the inverter 28 through the capacitor 34a, the primary winding 36P of the transformer 36, the capacitor 37 to the IGBT 30d, which results in the charging of the capacitor 34a, as represented by an increasing voltage V34a shown in FIG. 3(c).

At the same time, charge which has been stored on the capacitor 34b during the conduction of the IGBT 30a starts to be discharged, and the discharge current flows through the primary winding 36P and the IGBT 30d. Accordingly, voltage V34b across the capacitor 34b decreases as shown in FIG. 3(c). Due to the charging of the capacitor 34a and the discharging of the capacitor 34b, the current I1 continues to flow, as shown in FIG. 3(e). The charging and the discharging finish at a time $t_1$.

At the time $t_1$, the diode 32b, which has been reverse-biased by the charge on the capacitor 34b, becomes conductive. While the IGBT 30a is nonconductive, circulating current based on the energy stored in the transformer 36 flows through the primary winding 36P, the capacitor 37, the IGBT 30d and the diode 32b, as shown in FIG. 3(f). Thus, the current I1 continues to flow, as shown in FIG. 3(e), and current is supplied to the load through the saturable reactor 40a and the diode 42a. This current maintains the saturable reactor 40a saturated. After the time $t_1$, a gate signal G30b is applied to the gate of the IGBT 30b, but it is maintained nonconductive until the energy in the transformer 36 is fully discharged.

At a time $t_2$, the gate signal G30d is removed, so that the IGBT 30d becomes nonconductive. Accordingly, the current 130d becomes zero, as shown in FIG. 3(g). At the same time, the capacitor 34d starts being charged, so that the voltage V34d across the capacitor 34d starts increasing, as shown in FIG. 3(d). Also, the capacitor 34c starts discharging through the input of the inverter 28, the smoothing capacitor 20, the diode 32b, the primary winding 36P of the transformer 36 and the capacitor 37, so that the voltage V34c across the capacitor 34c decreases, as shown in FIG. 3(d). Since the capacitor 34b has discharged and the voltage V34d across the capacitor 34d has increased, the voltage between the output nodes A and B of the inverter 28 is reversed. That is, the potential at the output node B is higher than the potential at the output node A.

Because of the reversal of the voltage between the output nodes A and B, the voltage inducted in the secondary winding 36S of the transformer 36 is also reversed. However, the voltage induced in the secondary winding 36S immediately after the reversal is low, no current flows in the rectifier diode 42b and the saturable reactor 40b is maintained unsaturated. Further, the diode 42a is reverse-biased into a nonconductive state, which results in zero current flowing through the saturable reactor 40a. Thus, the reactor 40a becomes unsaturated.

At a time $t_3$, the diode 32c becomes conductive because the voltage V34c across the capacitor 34c has decreased, and circulating current based on the energy stored in the transformer 36 flows through the primary winding 36P of the transformer 36, the capacitor 37, the diode 32c, the smoothing capacitor 20 and the diode 32b. After the time $t_3$, though a gate signal G30c is applied to the gate of the IGBT 30c, the IGBT 30c is not rendered conductive because the circulating current is flowing.

At a time $t_4$, the IGBTs 30b and 30c are rendered conductive, so that the currents 130b and 130c shown in FIGS. 3(f) and 3(g) flow. Accordingly, the current I1 flows through the primary winding 36P of the transformer 36 in the opposite direction, as shown in FIG. 3(e). This makes the saturable reactor 40b saturated, and current flows through the load.

At a time $t_5$, the gate signal G30b is removed from the IGBT 30b, which completes one half cycle of the operation of the DC power supply apparatus.

Thereafter, similar operation is repeated.

As described above, the voltage applied to each of the IGBTs 30a, 30b, 30c and 30d increases when no gate signal is being applied to that IGBT. Also, current flows through each of the IGBTs 30a–30d when the gate signal for that IGBT is applied to it, but it flows only after the voltage applied to that IGBT becomes zero. That is, each IGBT is zero-voltage switched. Accordingly, switching loss occurring in the IGBTs can be suppressed.

Figure 4:
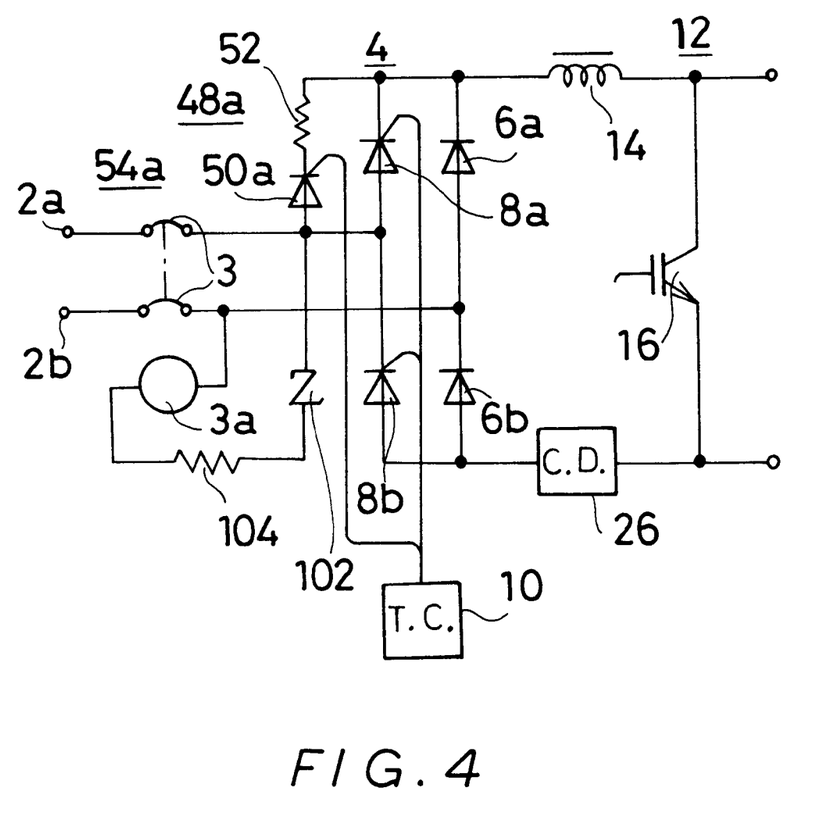
FIG. 4 is a block circuit diagram of part of a DC power supply apparatus according to a second embodiment of the present invention.

FIG. 4 shows a part of a DC power supply apparatus according to a second embodiment of the present invention. Although not shown, the remaining part is the same as the apparatus shown in FIG. 1, except that an overvoltage protection circuit 54a and a pre-charging circuit 48a are used in place of the overvoltage protection circuit 54 and the pre-charging circuit 48 of FIG. 1.

The switch 3 of the overvoltage protection circuit 54a includes a tripping coil 3a. The switch 3 is closed when no current is flowing in the tripping coil 3a, but it is automatically opened as current flows through the coil 3a. The tripping coil 3a is connected in series with a constant voltage device, e.g. a zener diode 102, and a resistor 104, and the series combination is connected between the input terminals 2a and 2b. The rating of the zener diode 102 and the value of the resistor 104 are selected such that when the 100 V or 200 V AC voltage is being applied between the input terminals 2a and 2b, the zener diode 102 is nonconductive, but it is rendered conductive when the 400 V AC voltage is applied between the input terminals 2a and 2b.

Thus, with the 100 V or 200 V voltage being applied between the input terminals 2a and 2b, the zener diode 102 is not conductive, and, therefore, no current flows through the tripping coil 3a. Accordingly, the switch 3 is kept closed.

In contrast, if the 400 V input AC voltage is applied between the input terminals 2a and 2b, the zener diode 102 conducts current, which flows through the tripping coil 3a, and, therefore, the switch 3 is opened. Accordingly, neither the input rectifier circuit 4 nor the pre-charging circuit 48a is operative. Therefore, if the 400 V AC voltage is inadvertently applied between the input terminals 2a and 2b of the DC power supply apparatus, none of the IGBTs or the capacitors used are damaged.

Because of the arrangement of the overvoltage protection circuit 48a substituted for the overvoltage protection circuit 40, the diode 50 used in the pre-charging circuit 48 is replaced by a thyristor 50a, which is ON-OFF controlled, together with the thyristors 8a and 8b, by the thyristor control circuit 10. As shown in FIG. 4, the thyristor control circuit 10 does not include the normally closed contact 76a and is operable when the constant voltage is supplied to it from the circuit 80 shown in FIG. 2.

Each of the above-described embodiments uses an inverter as a DC-to-high-frequency converter, but any other arrangement can be used only if it can provide a high-frequency voltage through the ON-OFF control of semiconductor switching devices. Further, the voltage-boosting converter 12 of the first and second embodiments can be removed if the DC power supply apparatus is normally used from either one of, e.g. 100 V and 200 V input AC voltages.

In the DC power supply apparatus according to the first embodiment, the input AC voltage is rectified and smoothed, and the resulting rectified and smoothed voltage is compared with a reference voltage in the comparator 62. Alternatively, a series combination of the relay coil 76 with a zener diode like the one used in the second embodiment may be connected between the input terminals 2a and 2b. On the other hand, in the second embodiment, the rectifier 56, the voltage-divider resistors 66 and 68, the comparator 62, the switching transistor 72 etc. as used in the first embodiment may be used, with the tripping coil 3a connected in the output of the transistor 72.

What is claimed is:

1. A DC power supply apparatus comprising:
    a rectifier circuit for rectifying an input commercial AC voltage;
    a smoothing capacitor for smoothing a rectified output voltage from said rectifier circuit;
    a DC-to-high-frequency converter circuit for converting a smoothed DC voltage from said smoothing capacitor into a high-frequency voltage;
    a transformer for voltage-transforming the high-frequency voltage supplied from said DC-to-high-frequency converter circuit;
    a high-frequency-to-DC converter circuit for converting a voltage-transformed, high-frequency voltage supplied from said transformer into a DC voltage;
    a pre-charging circuit for pre-charging, when said input commercial AC voltage is applied to said DC power supply apparatus, said smoothing capacitor from the input commercial AC voltage; and
    an overvoltage protection circuit for rendering said pre-charging circuit and said rectifier circuit inoperative when said input commercial AC voltage is a voltage having a magnitude larger than a prescribed value.

2. The DC power supply apparatus according to claim 1 wherein a voltage-boosting converter is connected between said rectifier circuit and said smoothing capacitor for boosting said rectified output voltage from said rectifier circuit to a predetermined voltage and also for adjusting the phase of input current to said DC power supply apparatus so as to be in phase with said input commercial AC voltage to thereby improve a power factor of said DC power supply apparatus.

3. The DC power supply apparatus according to claim 1 wherein said DC-to-high-frequency converter circuit comprises a zero-voltage switching inverter.

4. The DC power supply apparatus according to claim 3 wherein:
    said inverter comprises two series combinations each comprising two serially connected switching devices, said two series combinations being connected in parallel with each other;

said transformer constitutes a load of said inverter; and said high-frequency-to-DC converter circuit comprises a series combination of a rectifier and a saturable reactor.

5. A DC power supply apparatus comprising:

a rectifier circuit for rectifying an input commercial AC voltage;

a smoothing capacitor for smoothing a rectified output voltage from said rectifier circuit;

a DC-to-high-frequency converter circuit for converting a smoothed DC voltage from said smoothing capacitor into a high-frequency voltage;

a transformer for voltage-transforming the high-frequency voltage supplied from said DC-to-high-frequency converter circuit;

a high-frequency-to-DC converter circuit for converting a voltage-transformed, high-frequency voltage supplied from said transformer into a DC voltage;

a pre-charging circuit for pre-charging, when said input commercial AC voltage is applied to said DC power supply apparatus, said smoothing capacitor from the input commercial AC voltage; and an overvoltage protection circuit for decoupling said pre-charging circuit and said rectifier circuit from said input commercial AC voltage when said input commercial AC voltage is a voltage having a magnitude larger than a prescribed value.

6. The DC power supply apparatus according to claim 5 wherein a voltage-boosting converter is connected between said rectifier circuit and said smoothing capacitor for boosting said rectified output voltage from said rectifier circuit and also for adjusting the phase of input current to said DC power supply apparatus so as to be in phase with said input commercial AC voltage to thereby improve a power factor of said DC power supply apparatus.

7. The DC power supply apparatus according to claim 5 wherein said DC-to-high-frequency converter circuit comprises a zero-voltage switching inverter.

8. The DC power supply apparatus according to claim 7 wherein:

said inverter comprises two series combinations each comprising two serially connected switching devices, said two series combinations being connected in parallel with each other;

said transformer constitutes a load of said inverter; and said high-frequency-to-DC converter circuit comprises a series combination of a rectifier and a saturable reactor.

* * * * *